US011269709B2

(12) United States Patent
Martick

(10) Patent No.: US 11,269,709 B2
(45) Date of Patent: Mar. 8, 2022

(54) AUTOMATED INCIDENT HANDLING FOR SOFTWARE COMPONENTS

(71) Applicant: SAP SE, Walldorf (DE)

(72) Inventor: Christian Martick, Walldorf (DE)

(73) Assignee: SAP SE, Walldorf (DE)

( * ) Notice: Subject to any disclaimer, the term of this patent is extended or adjusted under 35 U.S.C. 154(b) by 91 days.

(21) Appl. No.: 16/153,469

(22) Filed: Oct. 5, 2018

(65) Prior Publication Data

US 2020/0110646 A1  Apr. 9, 2020

(51) Int. Cl.
*G06F 11/00* (2006.01)
*G06F 11/07* (2006.01)
*G06F 16/242* (2019.01)
*G06F 16/2455* (2019.01)

(52) U.S. Cl.
CPC ........ *G06F 11/079* (2013.01); *G06F 11/0751* (2013.01); *G06F 11/0787* (2013.01); *G06F 16/242* (2019.01); *G06F 16/24558* (2019.01)

(58) Field of Classification Search
CPC ............ G06F 11/0706; G06F 11/0718; G06F 11/3612; G06F 11/3636; G06F 11/366; G06F 11/3668; G06F 11/3672; G06F 11/3688; G06F 16/24558; G06F 16/242; G06F 11/0751; G06F 11/0781; G06F 11/079; G06F 11/0787
USPC ...................................................... 714/1–57
See application file for complete search history.

(56) References Cited

U.S. PATENT DOCUMENTS

| | | | |
|---|---|---|---|
| 6,892,317 B1* | 5/2005 | Sampath | G06F 11/25 714/4.3 |
| 2008/0148110 A1* | 6/2008 | Bhamidipaty | G06F 16/3338 714/57 |
| 2009/0307537 A1* | 12/2009 | Chen | G06F 11/1068 714/54 |
| 2011/0078512 A1* | 3/2011 | Grube | G06F 11/10 714/42 |
| 2012/0136858 A1* | 5/2012 | Aslot | G06F 11/079 707/737 |
| 2012/0210299 A1* | 8/2012 | Pasternak | G06F 9/4493 717/115 |
| 2012/0239696 A1* | 9/2012 | Wessling | G06F 16/217 707/780 |

(Continued)

*Primary Examiner* — Sarai E Butler
(74) *Attorney, Agent, or Firm* — Fountainhead Law Group P.C.

(57) ABSTRACT

Embodiments relate to an incident handling system for individual components of an overall software system. In particular, an engine receives error data information from a source of error information in a software component. That error information source may comprise a log entry, a formal error message, an exception, or a system crash. In response, the engine queries an underlying metadata description of the software system to receive a query result with additional metadata (e.g., unique artifact identifier, name) relevant to the error. Analysis of the error data and error metadata allows the engine to create an incident that is dispatched to an existing error tracking system, for support ticket creation and handling by the appropriate party. Adapter(s) allow the incident handling system to convert error data into generic form for search/analysis, and then to convert the incident information back into the specific format expected by the existing error tracking system.

11 Claims, 13 Drawing Sheets

(56) References Cited

U.S. PATENT DOCUMENTS

| | | | |
|---|---|---|---|
| 2013/0173965 A1* | 7/2013 | Son | G06F 11/0748 |
| | | | 714/37 |
| 2014/0075248 A1* | 3/2014 | Sevilmis | G06F 11/0772 |
| | | | 714/45 |
| 2014/0181592 A1* | 6/2014 | Andrew | G06F 11/3664 |
| | | | 714/38.1 |
| 2015/0154079 A1* | 6/2015 | Lightner | G06F 11/2023 |
| | | | 714/4.11 |
| 2015/0154316 A1* | 6/2015 | Lightner | G06F 16/2468 |
| | | | 707/723 |
| 2015/0244558 A1* | 8/2015 | Tully | H04L 29/08882 |
| | | | 709/201 |
| 2016/0070726 A1* | 3/2016 | Macnicol | G06F 16/245 |
| | | | 707/691 |
| 2016/0085799 A1* | 3/2016 | Kim | G06F 16/242 |
| | | | 707/706 |
| 2016/0239487 A1* | 8/2016 | Potharaju | G06F 16/24578 |
| 2017/0075792 A1* | 3/2017 | Udvuleanu | G06F 11/3636 |
| 2017/0091008 A1* | 3/2017 | Cherbakov | H04L 43/0864 |
| 2017/0109261 A1* | 4/2017 | Bhogal | G06F 11/3636 |
| 2018/0160189 A1* | 6/2018 | Engineer | G06F 16/438 |
| 2018/0181657 A1* | 6/2018 | Giardina | H04L 63/101 |
| 2019/0004979 A1* | 1/2019 | Scott | G06F 13/1631 |
| 2019/0079758 A1* | 3/2019 | Roh | G06F 40/166 |
| 2019/0356535 A1* | 11/2019 | Li | H04L 43/0811 |

* cited by examiner

| Number | Request | Clt | RC | Owner | Short Text |
|---|---|---|---|---|---|
| 1 | OSMK900019 | 001 | ♦ | | 2GET_ACTIVE_USERS |
| 2 | Z08K900004 | 001 | ♦ | | Empty test transport |
| 3 | Y13K396519 | 000 | ♦ | | |
| 4 | XD4K006469 | 000 | ♦ | | |
| 5 | GITK000090 | 000 | ◄ | | nodects fetch 9f0807d 20.12.2017 09:38:56 |
| 6 | Y13K413071 | 000 | ◄ | | 2017-12-20: abapvcs source |
| 7 | GITK000091 | 000 | ◄ | | nodects fetch 28c607e 20.12.2017 16:59:48 |
| 8 | GITK000092 | 000 | ● | | nodects fetch b6dafb 20.12.2017 17:12:33 |
| 9 | GITK000096 | 000 | ■ | | nodects fetch 55349e8 21.12.2017 15:12:24 |
| 10 | Y13K413405 | 000 | | | nodects push 2017-12-21 09:11:59 |

Requests for FS1: 3 / 10

AUTOMATED INCIDENT HANDLING FOR SOFTWARE COMPONENTS

BACKGROUND

Unless otherwise indicated herein, the approaches described in this section are not prior art to the claims in this application and are not admitted to be prior art by inclusion in this section.

Multi-faceted software landscapes are increasingly relied upon for the storage, manipulation, and analysis of large data volumes. According to one possible scenario, a software landscape may comprise distinct yet related software systems dedicated to processing logistical data and resource availability, respectively, for a given enterprise.

Moreover, such complex software landscapes are increasingly being migrated to cloud-based deployment and operation environments. In such a context, each link of a process chain involving human interaction can be costly and error prone.

For example, many existing software systems continue to rely upon human-powered process chains in order to provide a response/solution setup for errors and/or bugs arising in the software. Such intimate human involvement may interfere with the rapid, efficient, and precise handling of incidents arising from errors in software components.

SUMMARY

Embodiments relate to an incident handling system for individual components of an overall software system. In particular, an engine receives error data information from a source of error information in a software component. That error information source may comprise a log entry, a formal error message, an exception, or a system crash. In response, the engine queries an underlying metadata description of the software system to receive a query result with additional metadata (e.g., unique artifact identifier, name) relevant to the error. Analysis of the error data and error metadata allows the engine to create an incident that is dispatched to an existing error tracking system, for support ticket creation and handling by the appropriate party. Adapter(s) allow the incident handling system to convert error data into generic form for search/analysis, and then to convert the incident information back into the specific format expected by the existing error tracking system.

An embodiment of a computer-implemented method comprises an engine receiving error data from a first source of a first software component in a software system, and the engine formulating a query based upon the error data. The engine poses the query to a metadata description of the software system, the metadata description stored in a database. The engine receives from the database, a query result including error metadata relevant to the error data. The engine analyzes the error data and the error metadata to generate an incident. The engine dispatches the incident to an issue tracking system for creation of a support ticket.

A non-transitory computer readable storage medium embodies a computer program for performing a method comprising an engine receiving error data from a first source of a first software component in a software system. The engine formulates a query based upon the error data. The engine poses the query to a metadata description of the software system, the metadata description stored in a database and including a dependency. The engine receives from the database, a query result including error metadata relevant to the error data. The engine analyzes the error data and the error metadata to generate an incident. The engine dispatches the incident to an issue tracking system for creation of a support ticket.

An embodiment of a computer system comprises one or more processors and a software program executable on said computer system. The software program is configured to cause an in-memory database engine to receive error data from a first source of a first software component in a software system, to formulate a query based upon the error data, and to pose the query to a metadata description of the software system, wherein the metadata description is stored in an in-memory database. The software program is configured to cause the in-memory database engine to receive from the in-memory database, a query result including error metadata relevant to the error data. The software program is configured to cause the in-memory database engine to analyze the error data and the error metadata to generate an incident, and to dispatch the incident to an issue tracking system for creation of a support ticket.

According to certain embodiments the first source comprises a log.

In some embodiments the first source comprises a message.

In various embodiments, the metadata description of the software system comprises a dependency.

According to particular embodiments the error data comprises a source code position.

According to certain embodiments the error data comprises a unique name or identifier.

According to some embodiments the incident comprises a plurality of relevant components including the first component.

In some embodiments the engine identifies a first list of artifacts and a second list of artifacts from the query result, and generates a first list of components from the first list of artifacts. The engine generates a second list of components from the second list of artifacts, and merges the first list of components with the second list of components to create the plurality of relevant components.

In particular embodiments the database comprises an in-memory database and the engine comprises an in-memory database engine.

According to certain embodiments the in-memory database engine performs matching.

The following detailed description and accompanying drawings provide a better understanding of the nature and advantages of various embodiments.

BRIEF DESCRIPTION OF THE DRAWINGS

FIG. 8 shows a simplified interface indicating an error in a runtime system according to an example.

FIG. 10 shows a simplified log in to the exemplary runtime system.

FIG. 11 is a simplified interface showing an artifact and component identified by error analysis.

DETAILED DESCRIPTION

Described herein are methods and apparatuses implementing incident handling for software components. In the following description, for purposes of explanation, numerous examples and specific details are set forth in order to provide a thorough understanding of embodiments according to the present invention. It will be evident, however, to one skilled in the art that embodiments as defined by the claims may include some or all of the features in these examples alone or in combination with other features described below, and may further include modifications and equivalents of the features and concepts described herein.

Embodiments relate to an incident handling system for individual components of an overall software system. In particular, an engine receives error data information from a source of error information in a software component. That error information source may comprise a log entry, a formal error message, an exception, or a system crash. In response, the engine queries an underlying metadata description of the software system to receive a query result with additional metadata (e.g., unique artifact identifier, name) relevant to the error. Analysis of the error data and error metadata allows the engine to create an incident that is dispatched to an existing error tracking system, for support ticket creation and handling by the appropriate party. Adapter(s) allow the incident handling system to convert error data into generic form for search/analysis, and then to convert the incident information back into the specific format expected by the existing error tracking system.

Figure 1:
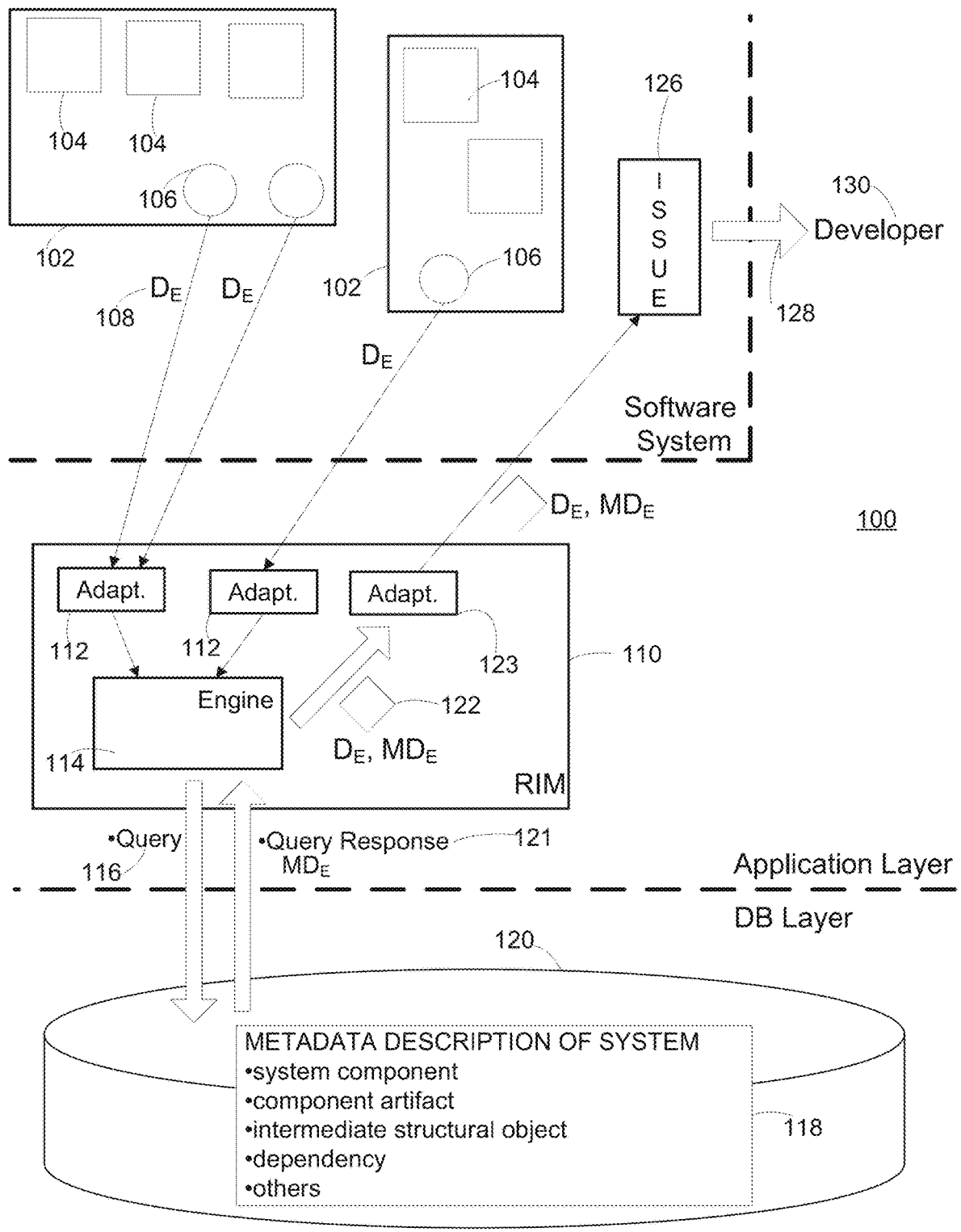
FIG. 1 shows a simplified diagram of a system according to an embodiment.

FIG. 1 shows a simplified view of an example system that is configured to implement software component incident handling according to an embodiment. Specifically, system 100 comprises a plurality of interrelated components 102. Examples of such interrelated components could include, but are not limited to, a Customer Relationship Management (CRM) component, and an Enterprise Resource Planning (ERP) component. Such components may be considered interrelated in that they share certain data that is common to a particular enterprise.

Each component of the system in turn includes a plurality of artifacts 104. Runtime artifacts are generated by the component during its operation. An example of a runtime artifact of a system component can be a data object that is organized according to a particular structure. A variety of many different types of artifacts are known to be produced by any particular system component during its operation.

FIG. 1 further shows each component as comprising at least one (and possibly multiple) sources 106 of error information. That is, during operation a component or artifact thereof may exhibit characteristics indicative of an error or problem with its function.

A variety of different sources of error information are possible. These include, but are not limited to, the following (listed below in approximate order of decreasing severity).

An acute failure may result in complete halt of the artifact and/or component. This type of error may automatically result in wholesale undifferentiated output of data having some relation to the stoppage. Examples of such data can include a time of event, a line number of code, a partial processing of inputs, and others. One example of such a source of acute failure data, is a DUMP event that can occur in the ABAP environment available from SAP SE, of Walldorf, Germany.

An official log entry may indicate the existence of an error. Such an official log entry may be formally generated as part of a classical log functionality offered by the system component. The log is implemented as a way to track operation of a complex component and/or artifact. Such an official log entry reflecting an error may or may not result from processing an error message by the log functionality.

The existence of an error may also be revealed by an official error message arising during processing. Such an error message may be automatically generated by the artifact or component as the result of some undesired or unexpected activity occurring during operation. Such an error message may not necessarily indicate a complete halt of the component or artifact, but is indicative that some sort of problem has occurred.

A runtime exception may also indicate the existence of an error. While not rising to the level of an error message, the existence of such an exception may serve as a symptom that all is not well with the component or artifact. One example of such an exception could be where the artifact or component deviates from an expected train of events (e.g., a component expects to receive a numerical value as an input, but receives a text string instead).

As indicated in FIG. 1, the source of error information produces error data $E_D$ 108. Depending upon the nature of the source of the error information, the $E_D$ can comprise one or more of:

component information (e.g., indirectly or directly by unique name or identifier);
artifact information (e.g., indirectly, or directly by unique name or identifier);
temporal information (e.g., time of error);
formal log entry identifier;
formal log entry content;
source code position;
source code content;
return code;
message identifier;
message content;
others.

That error data $E_D$ is in turn received by the error processing system 110, also referred to herein as the Runtime Issue Manager (RIM).

Specifically, the RIM features a plurality of adapters 112 that communicate with a specific system component. Those adapters are configured to recognize incoming error data (e.g., in a particular format) from the system component, and convert that error data into a generic form able to be processed by the engine 114 of the RIM.

That is, the RIM engine 114 is configured to receive generic error data from the component via the adapter. The RIM engine is further configured to analyze that error data, and provide additional information relevant thereto.

Specifically, based upon the error data received, the engine formulates a query 116 to the stored metadata description 118 of the software system. That metadata description includes in a centralized location (e.g., a database 120), as much information that is known about the software system.

Types of system metadata that are available in the description, can include but are not limited to:
components of the system;
artifact(s) of each system component;
intermediate structural objects (e.g., data object) linking artifacts to components;
dependencies; and
others.

As an example, a dependency that is stored in the metadata description, could indicate a dependency between different artifacts, between different components, or between an artifact and a component. A dependency can be logical or semantic in nature.

One example of a logical dependency exists where an artifact is dependent upon an upstream service to provide input already converted to a specific currency (e.g., conversion to U.S. $).

A semantic dependency arises where a structure of a component or artifact is dependent (explicitly or impliedly) upon another component or artifact. A syntactic dependency is one particular form of semantic dependency, where the syntax of the output of one component/artifact explicitly dictates the manner of processing of that output, which is input to a different component/artifact.

In response to the query including the error data received, a query response 121 is returned. That query response may include error metadata $MD_E$ that is not present in the original error data, but which is deemed potentially relevant to the error based upon one or more of: ●component, ●artifact, ●intermediate structural object, ●dependency, or ●other information available within the metadata description.

The content of the query result may reflect matching between the query and the metadata description. That matching may be performed utilizing techniques such as pattern matching and/or fuzzy search techniques.

The engine then compiles the original error data, together with additional metadata obtained from the query result, into an incident 122. In some embodiments, the incident may include an estimated severity of the issue, as may be determined from the nature of the source (e.g., with a system crash being considered more severe than error log entry, an error log entry being considered more severe than a formal error message, and a formal error message being considered more severe than an exception).

The incident is in turn communicated to an adapter 124 with the issue tracking component 126. The adapter 124 converts the incident into a format recognizable by the issue tracker.

The incident is in turn received by the issue tracking component. A support ticket 128 including the error data and the error metadata is then generated and communicated to the attention of the developer 130 for resolving the problem. As shown and described in connection with FIG. 4 below, such resolution can include fixing the problem, testing the fix, and deploying the fix.

In this manner, embodiments rapidly and automatically provide the developer with not only the original error data itself, but also a volume of additional metadata having some relevance to the problem being monitored.

Figure 2:
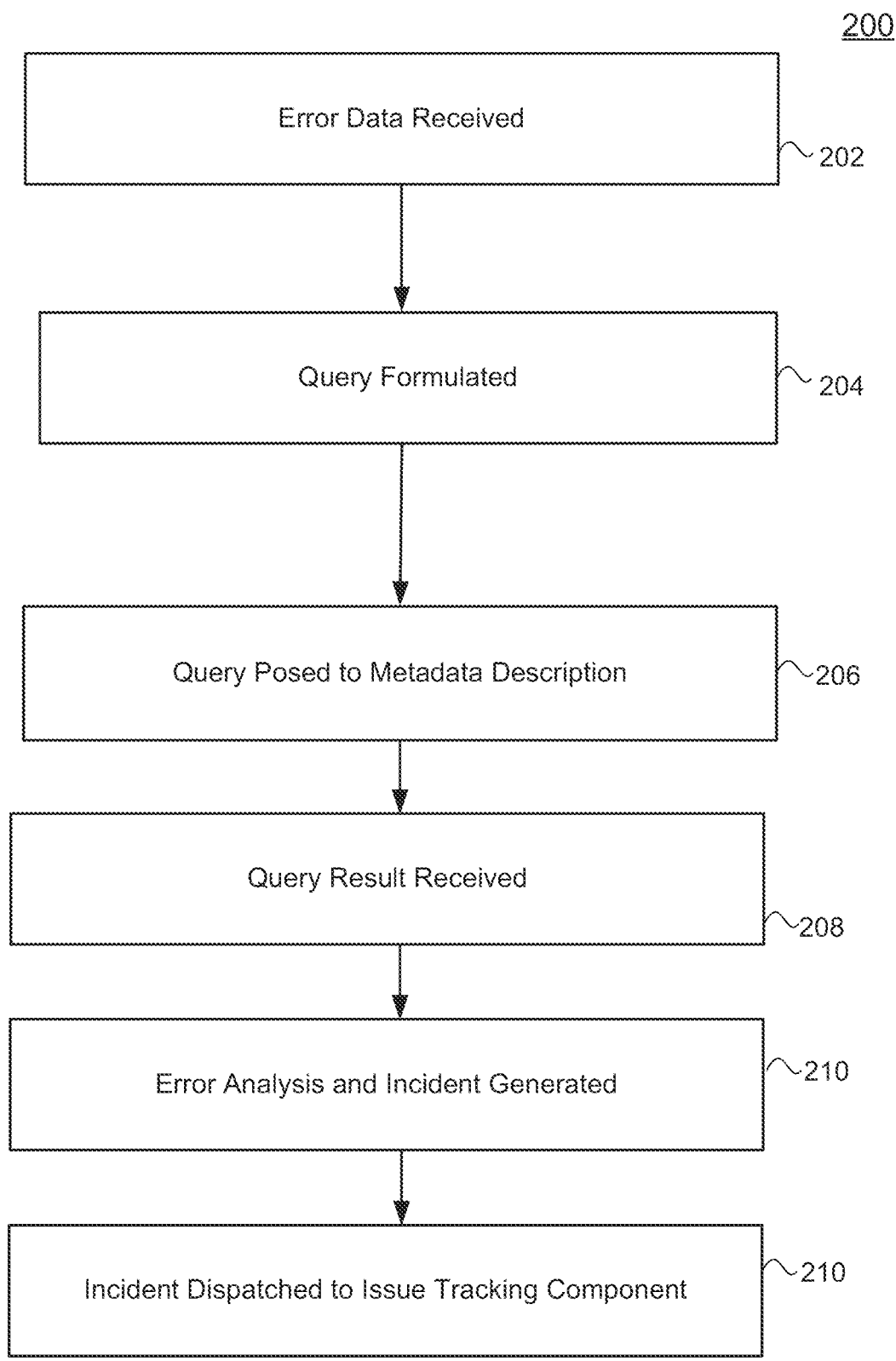
FIG. 2 shows a simplified flow diagram of a method according to an embodiment.

FIG. 2 is a flow diagram showing various actions taken in a method 200 according to an embodiment. At 202, an engine receives error data information from a source.

At 204, the engine analyzes the error data and formulates a query based upon the error data information. At 206, the engine poses the query to the stored metadata description of the system.

At 208, the engine receives from the stored metadata description, a query result including error metadata relevant to the error data. Information received from the query result may in turn be the subject of analysis to determine information relevant to the error, for example as shown and described below in connection with FIG. 6.

Thus at 210, the engine generates an incident comprising the error data and the error metadata. At 212, the engine dispatches the incident to an issue tracking component for handling (e.g., support ticket generation) by a responsible party (e.g., developer/developer team).

Figure 3:
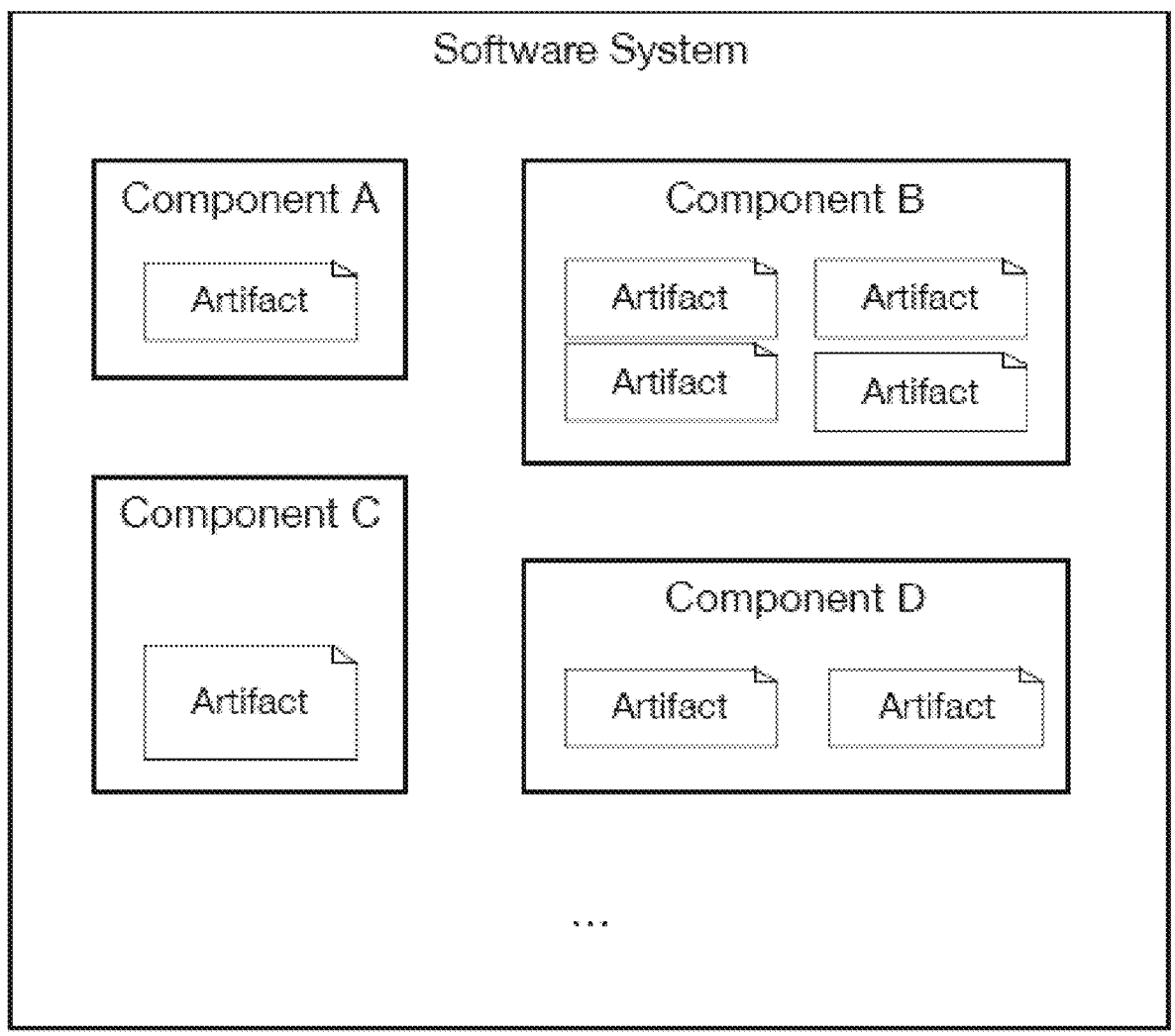
FIG. 3 shows a simplified view of a software system.

Further details regarding software component incident handling according to various embodiments, are now described. FIG. 3 shows a simplified view of a software system considered as a collection of software artifacts, grouped by semantic components. The components together comprise the whole system.

Components are built and described during design time of a software system, and serve as meta information in a runtime system to reflect dependencies. Such dependencies can be either logical or semantic in nature.

Each artifact and each component within a system serves a specific purpose, and can be uniquely identified. Artifacts, components, and other intermediate structural objects and their interconnections can be clearly described as part of the metadata description of the software system platform. That metadata description is accessible both during design-time and runtime.

When an application is executed in the context of such a software system, a number of software artifacts may be implicated. Executing a program can trigger the execution of many other artifacts, in sequence or even in parallel.

If an error does not occur, the process finishes at some point and returns to the user who initially triggered the program execution.

If, however, the software encounters an erroneous situation, the artifact causing the problem may generate some sort of error object (e.g., DUMP, formal log entry, message, or exception). That error object may be input to other artifacts and thereby alter the overall control flow of the system.

Figure 4:
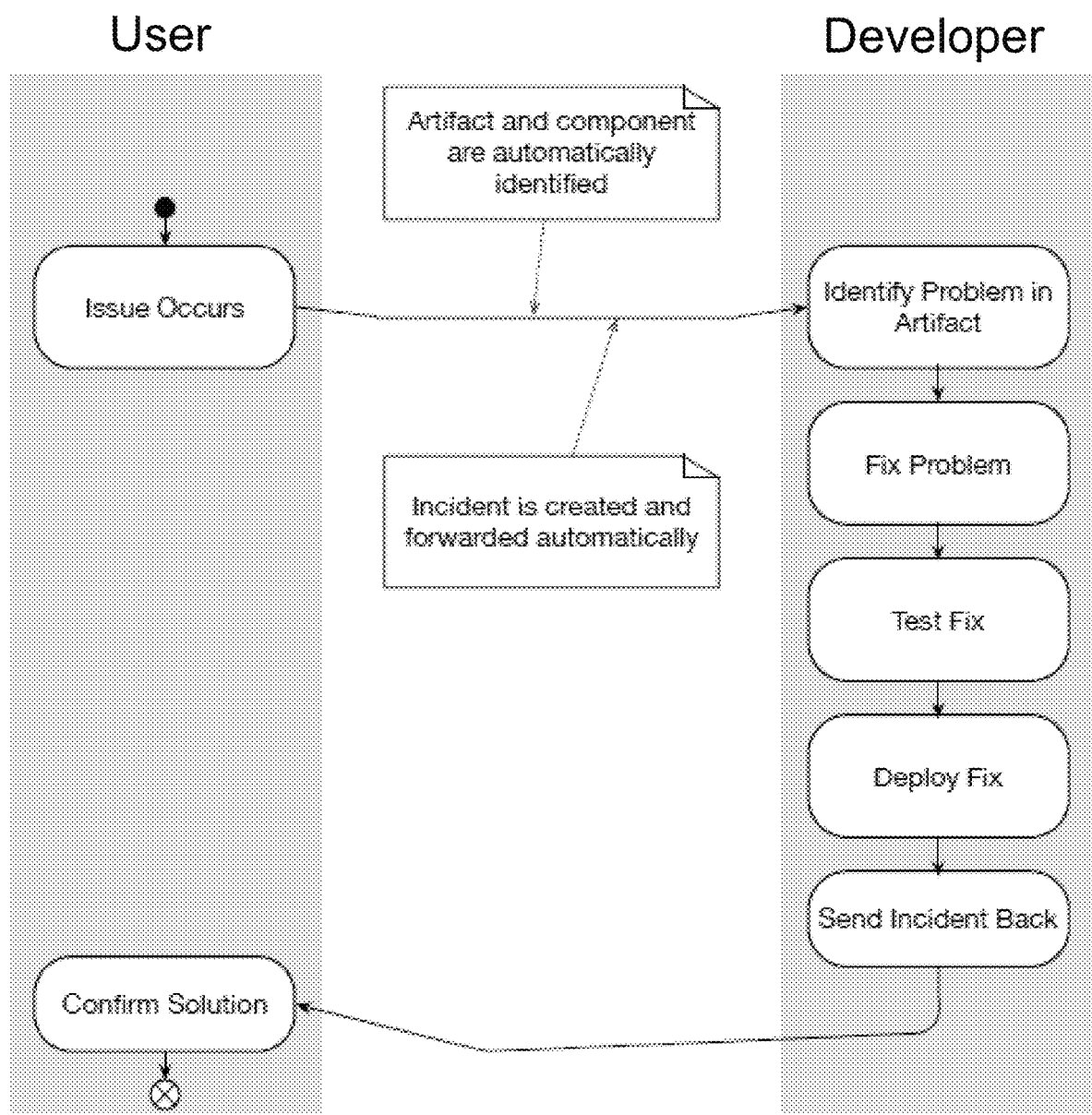
FIG. 4 shows a simplified flow diagram illustrating automated incident processing according to an embodiment.

Accordingly, embodiments function to automatically detect, classify, and process errors arising within a software system. FIG. 4 shows a simplified flow diagram illustrating automated incident processing according to an embodiment.

Specifically, the process of FIG. 4 automatically creates an incident whenever one is detected in a runtime system. If a user executes a report of an error, that error will be automatically reported by a monitoring component to the issue tracker tool.

The relevant artifact, component, and other meta information are detected and assigned according to an automated procedure. A corresponding responsible development member or team is assigned, and can quickly conduct appropriate analysis and resolve the problem.

Further details regarding a dedicated monitoring, analysis and reporting infrastructure supporting this automated process, are now provided.

Figure 5:
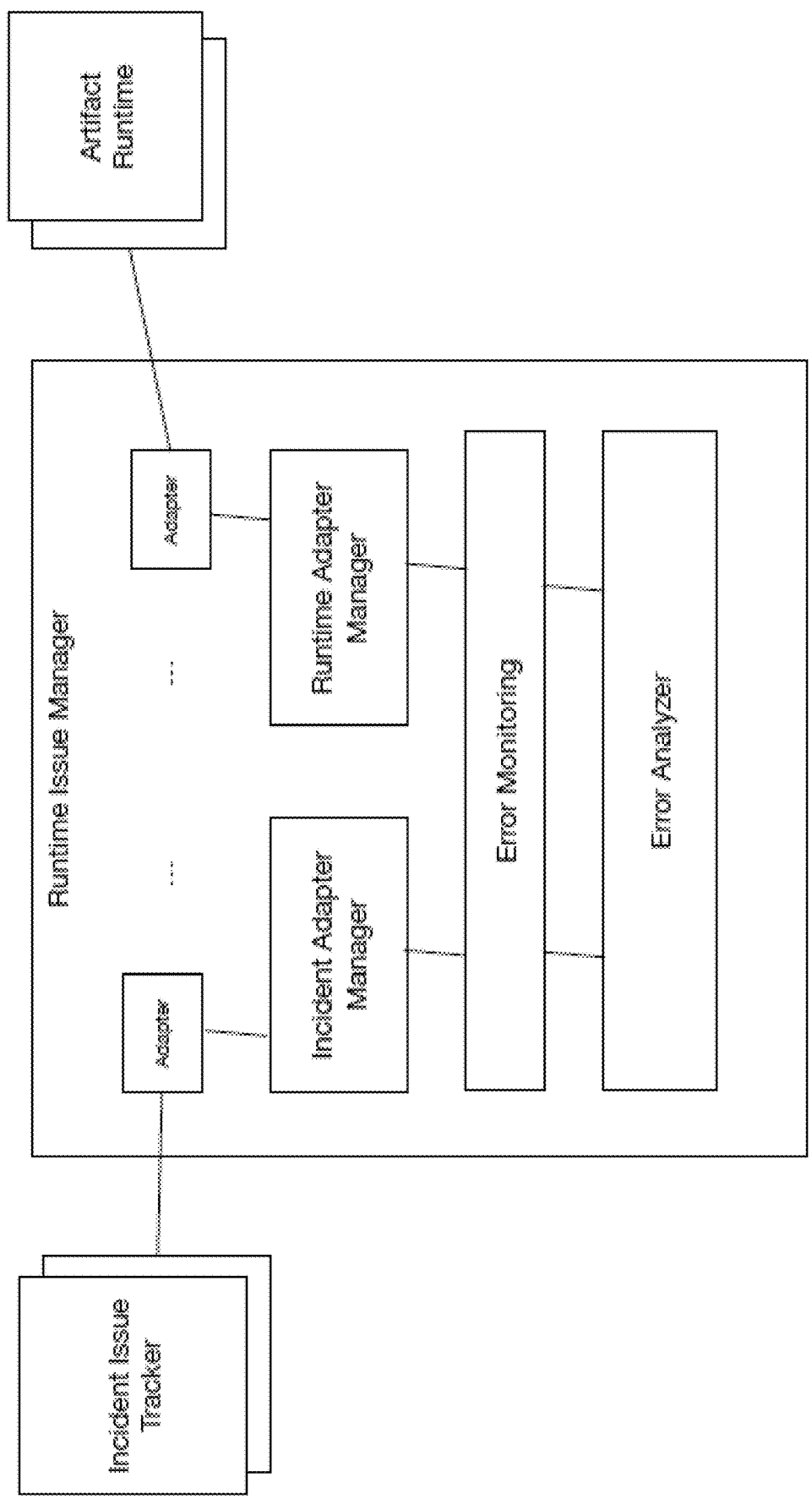
FIG. 5 is a simplified block diagram illustrating components of an embodiment for software incident handling.

FIG. 5 is a simplified block diagram illustrating components of an embodiment for software incident handling. The Runtime Issue Manager (RIM) serves as the overall orchestration tool. The RIM functions to:
monitor issues in the runtime systems,
analyze those issues (and their metadata), and
dispatch incidents to implemented issue trackers.

Many different types of runtime systems are known (e.g., Java RT, ABAP RT). Accordingly, the monitoring function is performed in a flexible manner to adapt to as many platforms as possible.

For that reason, each runtime platform is connected to the RIM via an adapter framework. This adapter framework knows how to access a runtime system, and also harmonizes the error and meta information that are provided by the runtime.

The retrieved data is monitored by the Error Monitoring Component. That monitoring component only triggers analysis of error data if an error is detected.

If an error is detected, the resulting error analysis leverages available meta and runtime data to identify relevant information sufficient to accurately categorize the issue, and assign it to a specific support component. Details regarding error analysis are provided below in connection with FIG. 6.

Based upon the result of the error analysis, an incident is created in the respective issue tracker tool. Again, a variety of different tools and platforms are available for error tracking. Thus, the adapter pattern is again leveraged in order to be able to access and control as many issue tracker tools as possible.

The RIM platform can be deployed within the artifact runtime, or outside in a separate runtime. A relevant boundary condition is the presence of a working adapter that is able to communicate with the artifact runtime (e.g., via HTTP, native ABAP RFC, or the like).

Further details regarding the error analysis process are now described. In particular, FIG. 6 offers an overview of error analysis according to an embodiment, depicting the basic structure of automatically analyzing the error data and illustrating how to condense that error data into the relevant information (e.g., software component information).

Figure 6:
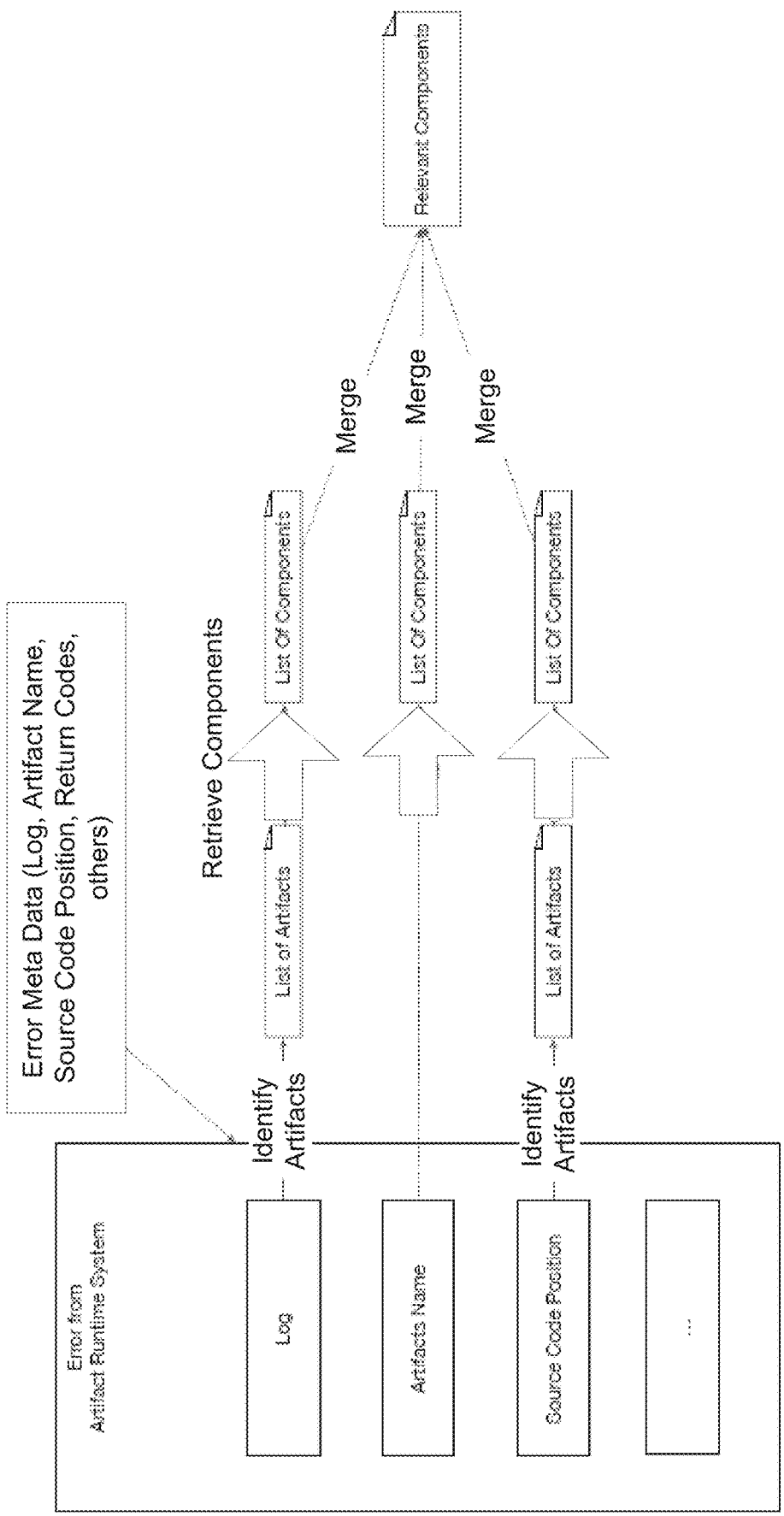
FIG. 6 offers a simplified overview of error analysis according to an embodiment.

As shown in FIG. 6, each type of runtime system provides potentially different error information back to the RIM. Examples of such error information can include but are not limited to:
logging data,
actual artifact descriptions,
source code positions (e.g., in ABAP),
runtime and stack information, and
others.

By accessing and parsing those sources of data, a list of potentially relevant software components can be automatically deduced. Such deduction can result from, e.g., mechanisms of fuzzy search or structural analysis.

In FIG. 6, the log data serves as input (e.g. in text form). Based on this, the list of potential artifacts is calculated using fuzzy and pattern search.

Using the matched pieces, the metadata of the artifact runtime system can then be queried to retrieve the list of involved components.

If the error provided by the runtime already identifies the software artifacts implicated (e.g., by their unique name or ID), the runtime can be directly queried for component information regarding the artefacts.

Figure 7:
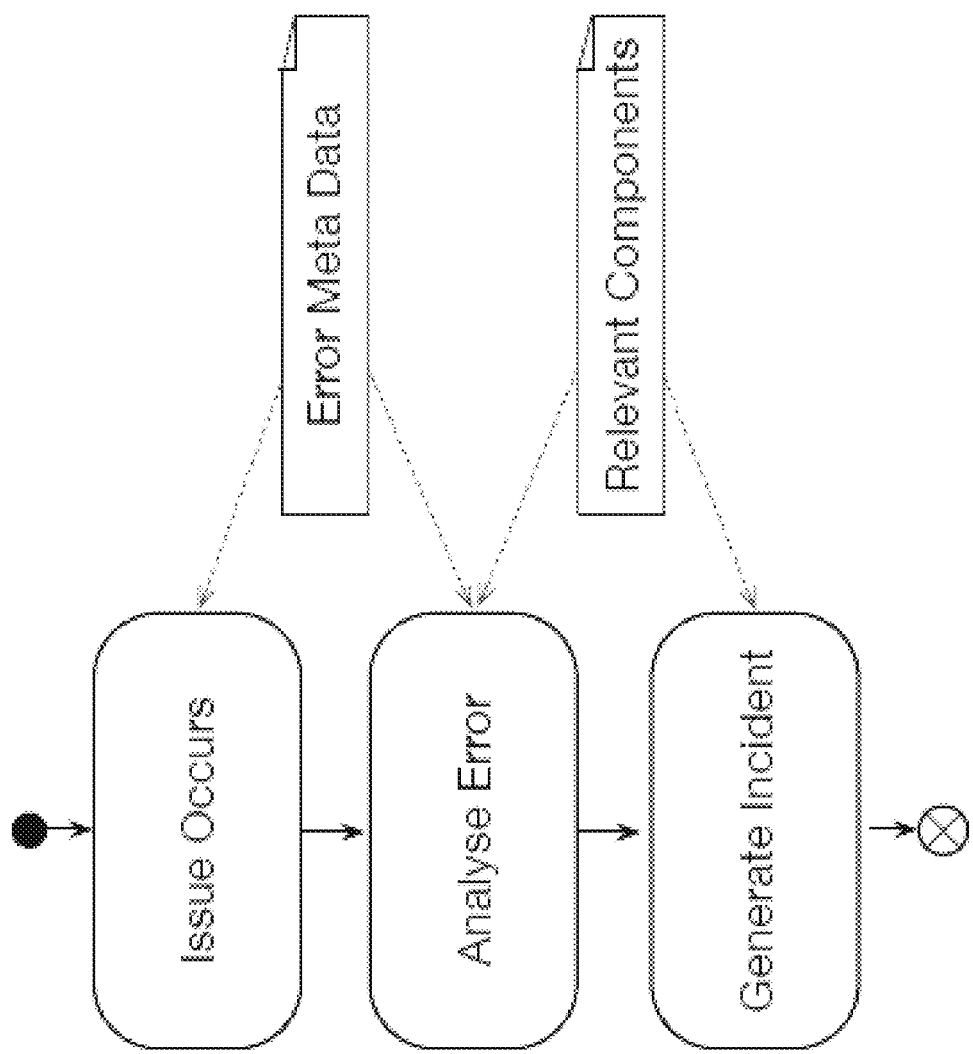
FIG. 7 shows an overall process flow in simplified form.

At the conclusion of error analysis, the result is a generated list of relevant components. That list can be utilized to create issues/support tickets in the respective tracking tool, and assign the incidents to the correct component (and therefore developer/team). This overall process flow is shown in simplified form in FIG. 7.

Details regarding incident handling for software components, are now provided in connection with a particular example involving specific elements available from SAP SE, of Walldorf, Germany.

Example

The following example is taken from the productive implementation of this invention in the context of an SAP Application Server ABAP runtime. The RIM tooling also resides in the runtime environment.

FIG. 8 shows a simplified interface indicating an error in a runtime system according to an example. In particular, this interface 800 displays an input queue for a system F51. The actual error is indicated as 802.

Figure 9:
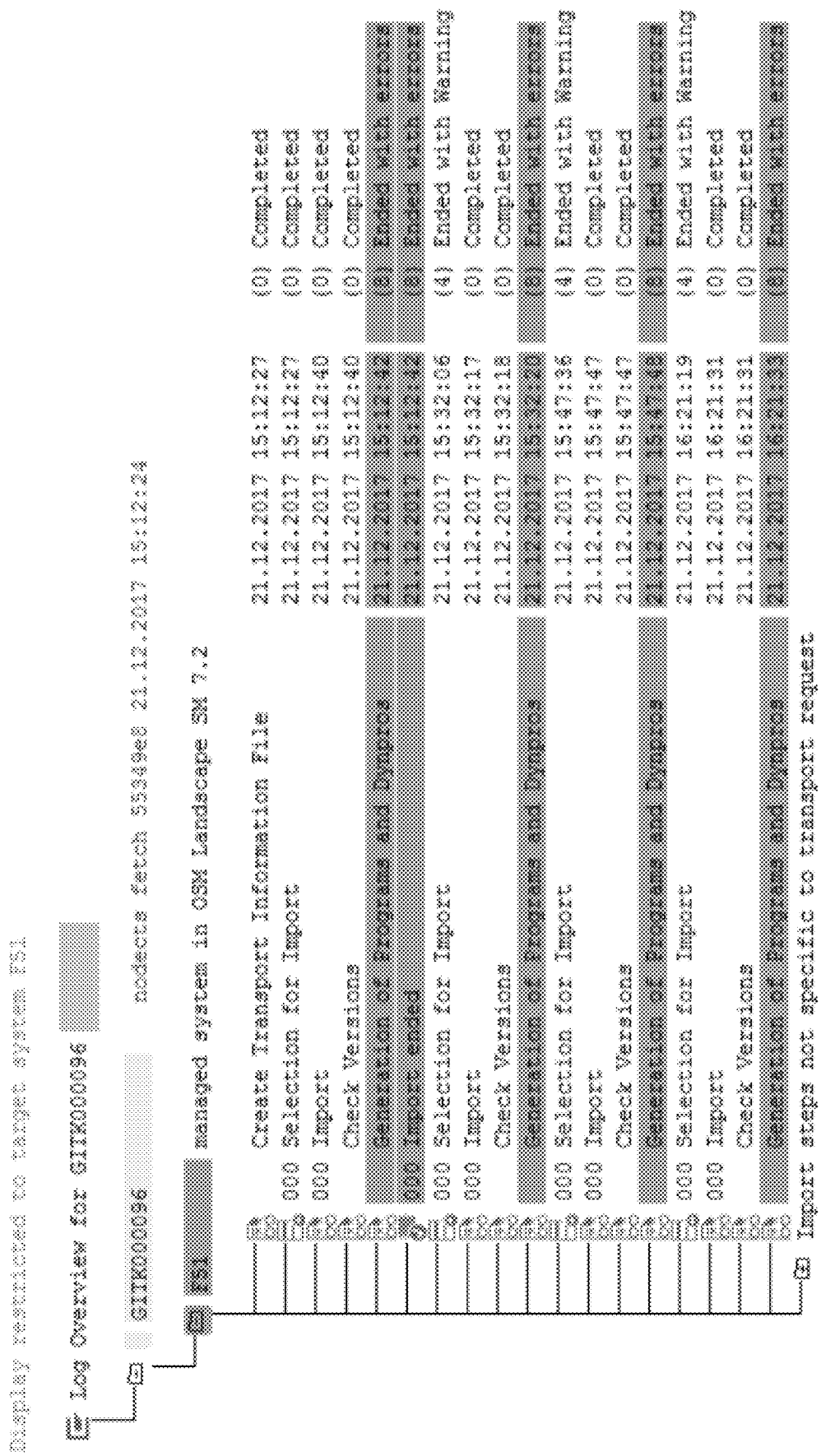
FIG. 9 shows a simplified log overview in the runtime system according to the example.

In response to the error, the system creates a log. FIG. 9 shows a simplified log overview in the runtime system according to the example.

Figure 10:
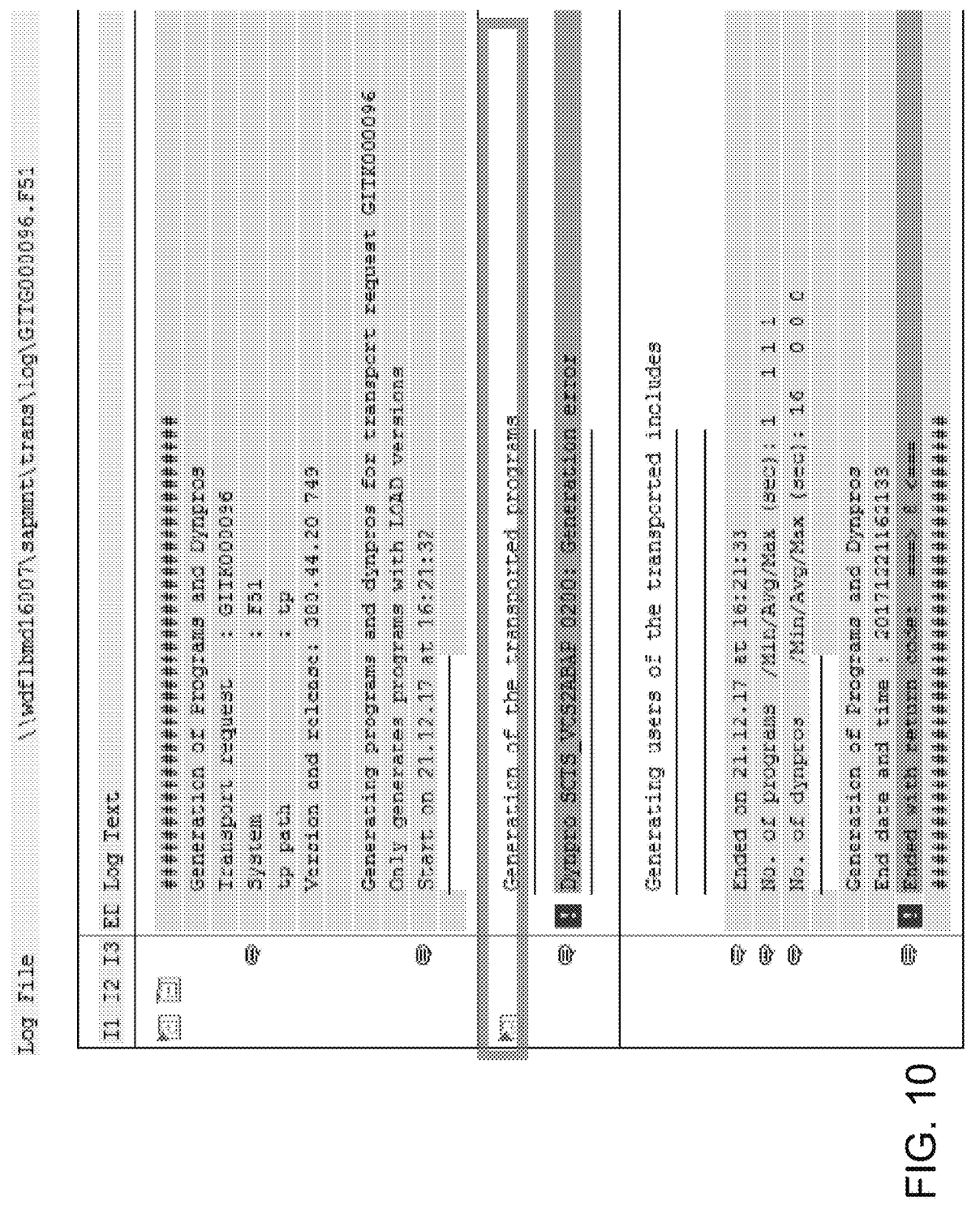

FIG. 10 shows a simplified log in to the exemplary runtime system. FIG. 10 indicates that the relevant artifact is reported by the runtime system as being: "SCTS_VCS2ABAP".

Now this error log information is retrieved by the RIM orchestration part, and then fed into the error analyzer. The result can be seen in FIG. 11.

Figure 11:
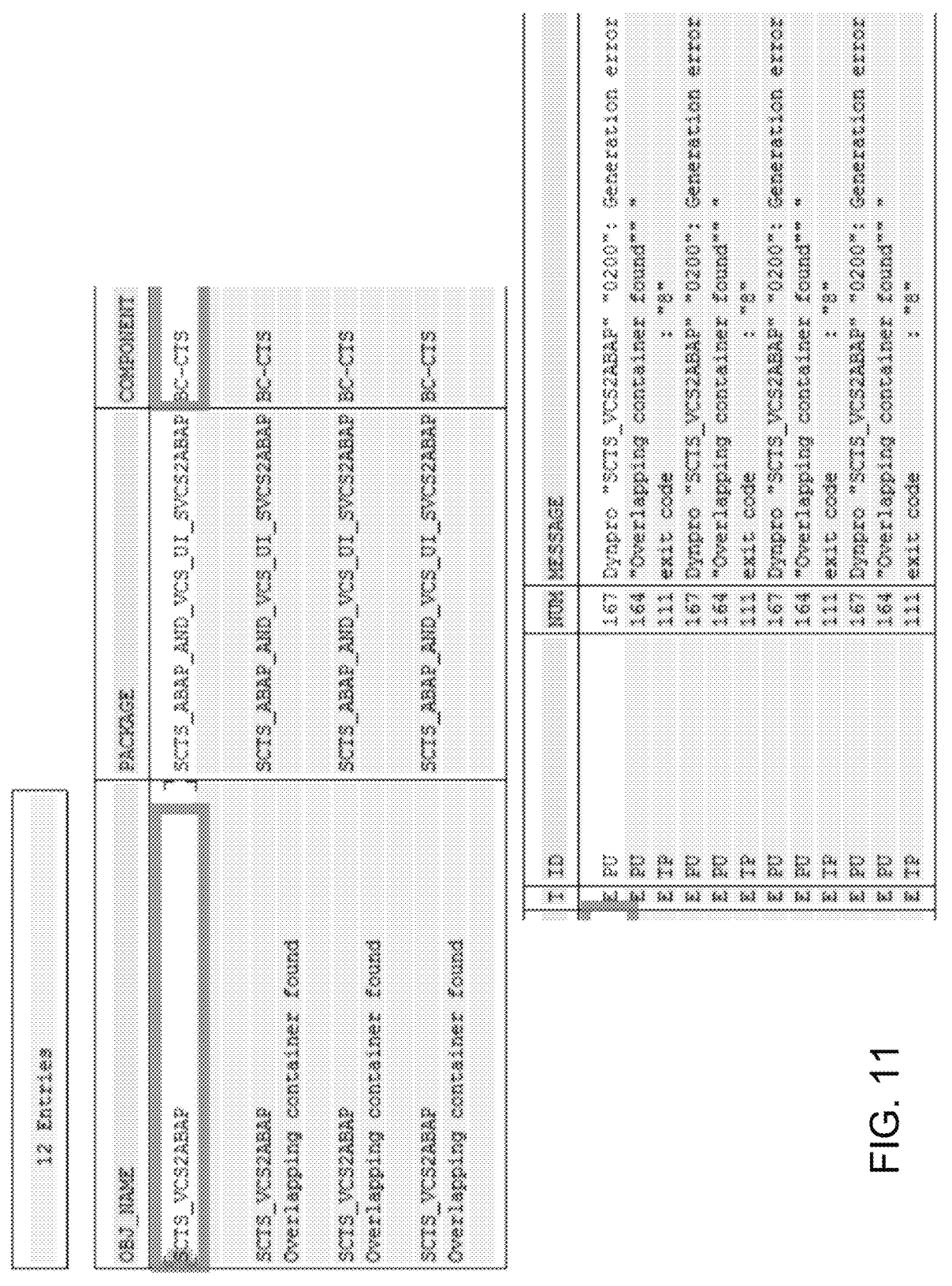

Specifically, FIG. 11 shows that the tool identified the object/artifact "SCTS_VCS2ABAP". The tool in turn retrieved the correct software component "BC-CTS".

This component information is then leveraged in order to open an incident. In this particular example, the incident is opened using SAP's internal Service Provider Cockpit.

Returning back to FIG. 1, while that particular embodiment depicts the engine of the incident handling system as separate from the database responsible for storing the system metadata description, this is not required. According to alternative embodiments the engine could be integrated with the database itself, for example to leverage the processing power of the in-memory database engine of the in-memory database storing the meta description of the software system. One example is the HANA in-memory database that is available from SAP SE of Walldorf, Germany.

Figure 12:
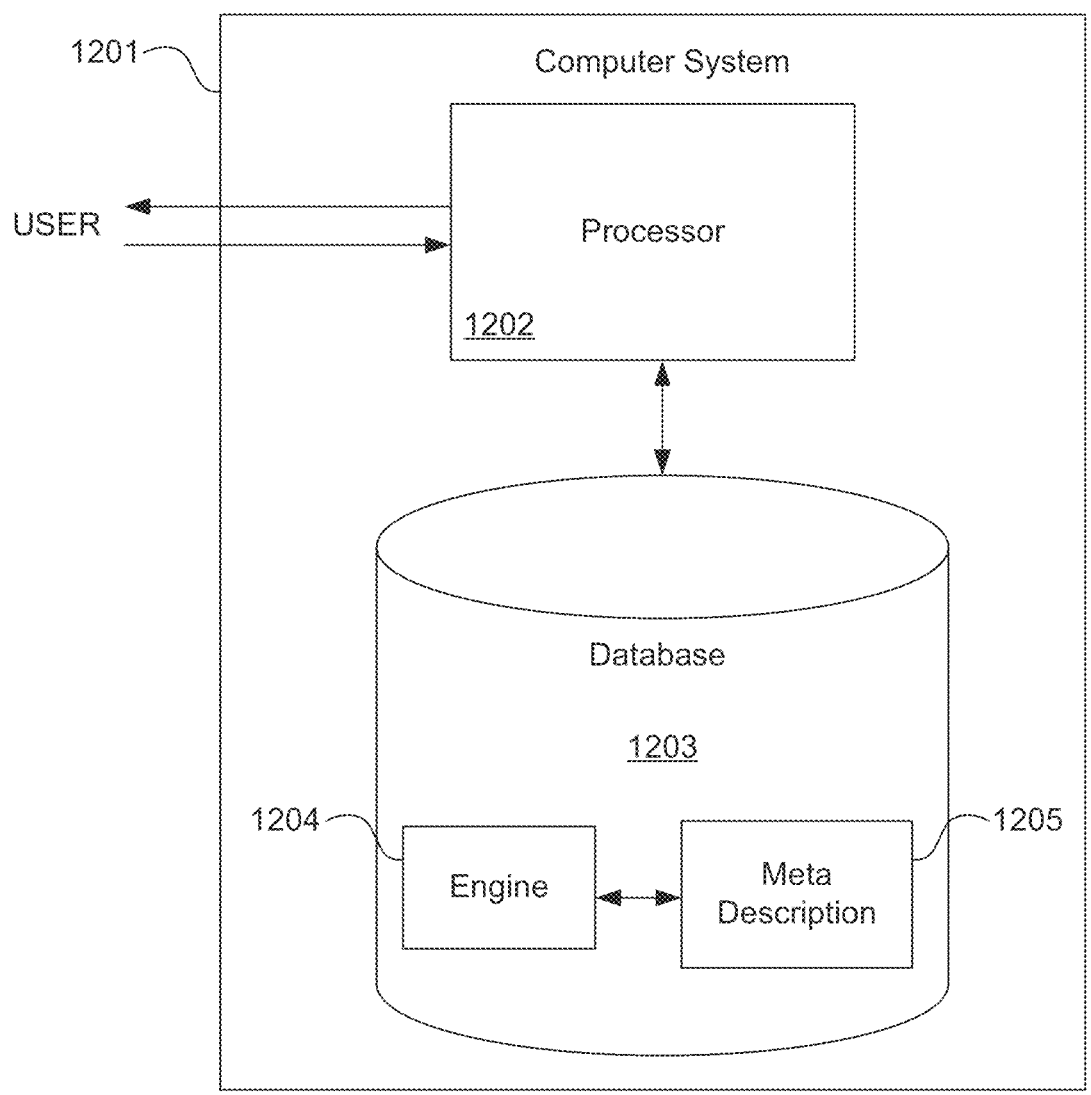
FIG. 12 illustrates hardware of a special purpose computing machine according to an embodiment that is configured to implement software component incident handling.

FIG. 12 illustrates hardware of a special purpose computing machine configured to implement software component incident handling according to an embodiment. In particular, computer system 1201 comprises a processor 1202 that is in electronic communication with a non-transitory computer-readable storage medium comprising a database 1203. This computer-readable storage medium has stored thereon code 1205 corresponding to a metadata description of software system platform. Code 1204 corresponds to an engine. Code may be configured to reference data stored in a database of a non-transitory computer-readable storage medium, for example as may be present locally or in a remote database server. Software servers together may form a cluster or logical network of computer systems programmed with software programs that communicate with each other and work together in order to process requests.

Error handling approaches according to embodiments may offer one or more benefits. In particular, implementing automated incident detection, analysis, and incident creation can reduce total cost of ownership (TCO) of the software systems.

That is, by streamlining the error detection process, embodiments reduce the involvement of human experts, whose limited attention may otherwise serve as an unwanted bottleneck. Embodiments also reduce processing times, and enhance the accuracy and repeatability of error analysis results.

Error handling according to embodiments may improve the quality of software system. That is, as each problem is automatically detected and processed, the reliability of software systems will improve over time.

Embodiments of error handling are also readily deployable in a cloud environment. Their automated approach permits scalable error tracking for a large number of connected components and artifacts.

Finally, embodiments may introduce valuable flexibility into error handling processes. The error analyzer can comprise a separate module that is readily amenable to periodic upgrade/enhancement according to the particular needs of specific runtime systems.

Figure 13:
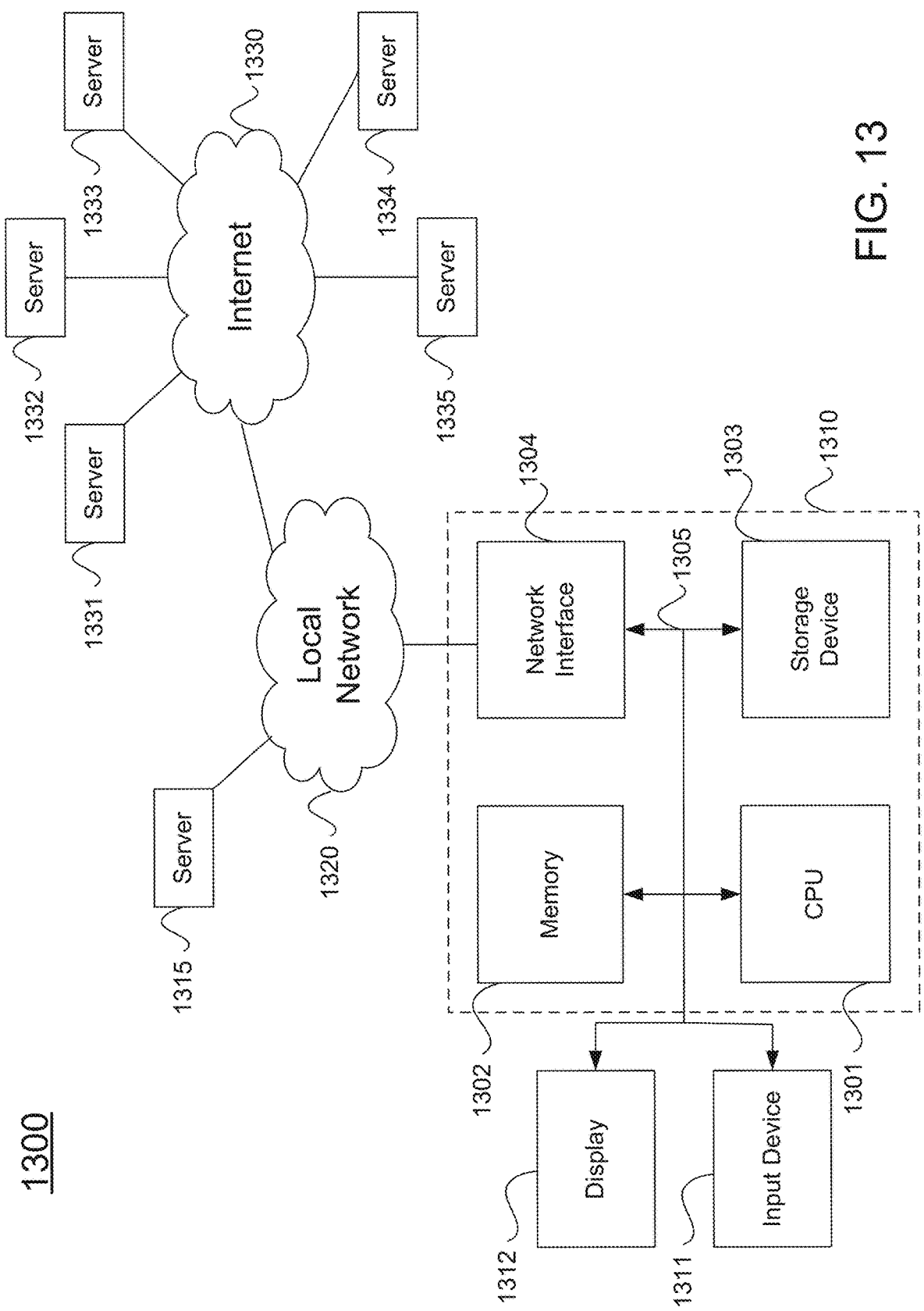
FIG. 13 illustrates an example computer system.

An example computer system 1300 is illustrated in FIG. 13. Computer system 1310 includes a bus 1305 or other communication mechanism for communicating information, and a processor 1301 coupled with bus 1305 for processing information.

Computer system 1310 also includes a memory 1302 coupled to bus 1305 for storing information and instructions to be executed by processor 1301, including information and instructions for performing the techniques described above, for example. This memory may also be used for storing variables or other intermediate information during execution of instructions to be executed by processor 1301. Possible implementations of this memory may be, but are not limited to, random access memory (RAM), read only memory (ROM), or both. A storage device 1303 is also provided for storing information and instructions. Common forms of storage devices include, for example, a hard drive, a magnetic disk, an optical disk, a CD-ROM, a DVD, a flash memory, a USB memory card, or any other medium from which a computer can read. Storage device 1303 may include source code, binary code, or software files for performing the techniques above, for example. Storage device and memory are both examples of computer readable mediums.

Computer system 1310 may be coupled via bus 1305 to a display 1312, such as a cathode ray tube (CRT) or liquid crystal display (LCD), for displaying information to a computer user. An input device 1311 such as a keyboard and/or mouse is coupled to bus 1305 for communicating information and command selections from the user to processor 1301. The combination of these components allows the user to communicate with the system. In some systems, bus 1305 may be divided into multiple specialized buses.

Computer system 1310 also includes a network interface 1304 coupled with bus 1805. Network interface 1304 may provide two-way data communication between computer system 1310 and the local network 1320. The network interface 1304 may be a digital subscriber line (DSL) or a modem to provide data communication connection over a telephone line, for example. Another example of the network interface is a local area network (LAN) card to provide a data communication connection to a compatible LAN. Wireless links are another example. In any such implementation, network interface 1304 sends and receives electrical, electromagnetic, or optical signals that carry digital data streams representing various types of information.

Computer system 1310 can send and receive information, including messages or other interface actions, through the network interface 1304 across a local network 1320, an Intranet, or the Internet 1330. For a local network, computer system 1310 may communicate with a plurality of other computer machines, such as server 1315. Accordingly, computer system 1310 and server computer systems represented by server 1315 may form a cloud computing network, which may be programmed with processes described herein. In the Internet example, software components or services may reside on multiple different computer systems 1310 or servers 1331-1335 across the network. The processes described above may be implemented on one or more servers, for example. A server 1331 may transmit actions or messages from one component, through Internet 1330, local network 1320, and network interface 1304 to a component on computer system 1310. The software components and processes described above may be implemented on any computer system and send and/or receive information across a network, for example.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A computer-implemented method comprising:
   an engine receiving error data from a first source of a first software component in a software system, the source comprising a log and the error data comprising a return code and log content that does not result from processing an error message by a log functionality;
   the engine formulating a query based upon the error data;
   the engine posing the query to a metadata description of the software system, the metadata description stored in a database;
   the engine receiving from the database a query result based upon pattern search and fuzzy search, the query result including error metadata relevant to the error data;
   the engine analyzing the error data and the error metadata to generate an incident comprising a plurality of relevant components including the first software component, by,
      identifying a first list of artifacts and a second list of artifacts from the query result,
      generating a first list of components from the first list of artifacts,
      generating a second list of components from the second list of artifacts, and
      merging the first list of components with the second list of components to create the plurality of relevant components; and
   the engine dispatching the incident to an issue tracking system for creation of a support ticket.

2. A method as in claim 1 wherein the metadata description of the software system comprises a dependency.

3. A method as in claim 1 wherein the error data comprises a source code position.

4. A method as in claim 1 wherein the error data comprises a unique name or identifier.

5. A method as in claim 1 wherein:
   the database comprises an in-memory database; and
   the engine comprises an in-memory database engine.

6. A method as in claim 5 wherein the in-memory database engine performs matching.

7. A non-transitory computer readable storage medium embodying a computer program for performing a method, said method comprising:
   an engine receiving error data from a first source of a first software component in a software system, the source comprising a log and the error data comprising a return code and log content that does not result from processing an error message by a log functionality;

the engine formulating a query based upon the error data;

the engine posing the query to a metadata description of the software system, the metadata description stored in a database and including a dependency;

the engine receiving from the database a query result based upon pattern search and fuzzy search, the query result including error metadata relevant to the error data;

the engine analyzing the error data and the error metadata to generate an incident comprising a plurality of relevant components including the first software component, by, identifying a first list of artifacts and a second list of artifacts from the query result, generating a first list of components from the first list of artifacts, generating a second list of components from the second list of artifacts, and merging the first list of components with the second list of components to create the plurality of relevant components; and the engine dispatching the incident to an issue tracking system for creation of a support ticket.

8. A non-transitory computer readable storage medium as in claim 7 wherein:

the database comprises an in-memory database;

the engine comprises an in-memory database engine; and the in-memory database engine performs matching.

9. A computer system comprising:

one or more processors;

a software program, executable on said computer system, the software program configured to cause an in-memory database engine of an in-memory database to:

receive error data from a first source of a first software component in a software system, the source comprising a log and the error data comprising a return code and log content that does not result from processing an error message by a log functionality;

formulate a query based upon the error data;

pose the query to a metadata description of the software system, the metadata description stored in the in-memory database;

receive from the in-memory database a query result based upon pattern search and fuzzy search, the query result including error metadata relevant to the error data;

analyze the error data and the error metadata to generate an incident comprising a plurality of relevant components including the first software component, by, identifying a first list of artifacts and a second list of artifacts from the query result, generating a first list of components from the first list of artifacts, generating a second list of components from the second list of artifacts, and merging the first list of components with the second list of components to create the plurality of relevant components; and dispatch the incident to an issue tracking system for creation of a support ticket.

10. A computer system as in claim 9 wherein the metadata description of the software system comprises a dependency.

11. A computer system as in claim 9 wherein the in-memory database engine performs matching.

* * * * *